(12) United States Patent
Ieda

(10) Patent No.: US 12,202,663 B2
(45) Date of Patent: Jan. 21, 2025

(54) WATER-SOLUBLE FILM FOR PACKAGING

(71) Applicant: SEKISUI CHEMICAL CO., LTD., Osaka (JP)

(72) Inventor: Yasuyuki Ieda, Aichi (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 431 days.

(21) Appl. No.: 16/633,634

(22) PCT Filed: Aug. 27, 2018

(86) PCT No.: PCT/JP2018/031528
§ 371 (c)(1),
(2) Date: Jan. 24, 2020

(87) PCT Pub. No.: WO2019/044751
PCT Pub. Date: Mar. 7, 2019

(65) Prior Publication Data
US 2020/0207530 A1    Jul. 2, 2020

(30) Foreign Application Priority Data

Aug. 30, 2017  (JP) ................. 2017-166231
Aug. 30, 2017  (JP) ................. 2017-166235

(51) Int. Cl.
| B65D 65/46 | (2006.01) |
| C08J 5/18  | (2006.01) |
| B29C 59/04 | (2006.01) |
| B29K 29/00 | (2006.01) |

(52) U.S. Cl.
CPC ............ B65D 65/46 (2013.01); C08J 5/18 (2013.01); *B29C 59/04* (2013.01); *B29K 2029/04* (2013.01); *B29K 2995/0062* (2013.01); *C08J 2329/04* (2013.01)

(58) Field of Classification Search
CPC .. B65D 65/46; B29C 59/04; C08J 5/18; C08J 2329/04
USPC ...................................................... 428/143
See application file for complete search history.

(56) References Cited

U.S. PATENT DOCUMENTS

| 6,166,117 | A  | 12/2000 | Miyazaki |
| 6,608,121 | B2 | 8/2003 | Isozaki et al. |
| 7,465,694 | B2 | 12/2008 | Date et al. |
| 7,745,517 | B2 | 6/2010 | Vicari et al. |
| 8,466,243 | B2 | 6/2013 | Vicari |
| 2002/0025413 | A1* | 2/2002 | Ohbayashi .............. B41M 5/52 428/32.1 |
| 2010/0270518 | A1* | 10/2010 | Lin .......................... G02B 1/04 252/585 |
| 2016/0271988 | A1* | 9/2016 | Oharuda ................. C08J 7/043 |
| 2016/0365555 | A1 | 12/2016 | Shinohara et al. |
| 2017/0247154 | A1* | 8/2017 | Ieda ........................ C08K 5/053 |
| 2017/0253708 | A1 | 9/2017 | Ieda et al. |
| 2018/0105338 | A1 | 4/2018 | Ieda et al. |
| 2019/0111659 | A1* | 4/2019 | Hatazawa ............... B32B 27/34 |

FOREIGN PATENT DOCUMENTS

| CN | 102731946 |   | 10/2012 |
| CN | 102975322 |   | 3/2013 |
| CN | 102975322 | A * | 3/2013 |
| CN | 105916685 |   | 8/2016 |
| JP | 6-2770 |   | 1/1994 |
| JP | 2001-328164 |   | 11/2001 |
| JP | 2002-146053 |   | 5/2002 |
| JP | 2002146053 | A * | 5/2002 |
| JP | 2002-347112 |   | 12/2002 |
| JP | 2002-361378 |   | 12/2002 |
| JP | 2002-361379 |   | 12/2002 |
| JP | 2003-181962 |   | 7/2003 |
| JP | 2007-22089 |   | 2/2007 |
| JP | 2009-7532 |   | 1/2009 |
| JP | 2011-206952 |   | 10/2011 |
| JP | 2013-141767 |   | 7/2013 |
| JP | 2014-43036 |   | 3/2014 |
| JP | 2016-117794 |   | 6/2016 |
| JP | 2017-52897 |   | 3/2017 |
| JP | 2017-119434 |   | 7/2017 |
| TW | 201702294 |   | 1/2017 |
| WO | 2005/035382 |   | 4/2005 |
| WO | 2014/046787 |   | 3/2014 |
| WO | WO-2016035671 | A1 * | 3/2016 | ............ C08K 3/08 |
| WO | 2016/167135 |   | 10/2016 |
| WO | 2016/182010 |   | 11/2016 |
| WO | 2016/185202 |   | 11/2016 |
| WO | WO-2016182010 | A1 * | 11/2016 | ............ B26D 1/14 |

OTHER PUBLICATIONS

Machine_English_translation_CN_102975322_A; Cui, Y.; Demolding method in production of polyvinyl alcohol solution tape casting films; Mar. 20, 2013; EPO; whole document (Year: 2013).*
Machine_English_translation_WO_2016182010_A; Katsuno, R., et al.; Polyvinyl Alcohol Film; Nov. 17, 2016; EPO; whole document (Year: 2016).*
Machine_English_translation_JP_2002146053_A; Mizutani, Tomoyoshi; Polyvinyl Alcohol Film; May 22, 2002; EPO; whole document (Year: 2002).*
Extended European Search Report issued Apr. 7, 2021, in corresponding European Patent Application No. 18852569.5.

(Continued)

*Primary Examiner* — Tahseen Khan
(74) *Attorney, Agent, or Firm* — Wenderoth, Lind & Ponack, L.L.P.

(57) ABSTRACT

A water-soluble packaging film according to the present invention is a water-soluble packaging film comprising a polyvinyl alcohol resin, and has, on a film surface, irregularities having a surface roughness (Ra) of 0.3 to 1 μm and a maximum height (Rz) of 3 to 9 μm.

13 Claims, No Drawings

(56) References Cited

OTHER PUBLICATIONS

Office Action issued Jun. 28, 2021 in corresponding Chinese Patent Application No. 201880054295. 7, with English Translation.
International Search Report (ISR) issued Sep. 25, 2018 in International (PCT) Application No. PCT/JP2018/031528.
Notice of Reasons for Refusal issued Jan. 28, 2021, in corresponding Japanese Patent Application No. 2018-234617, with Machine translation.

* cited by examiner

WATER-SOLUBLE FILM FOR PACKAGING

TECHNICAL FIELD

The present invention relates to a water-soluble packaging film made of a polyvinyl alcohol-based film.

BACKGROUND ART

A polyvinyl alcohol-based film has water solubility, and is widely used as a packaging material for holding various agents such as agricultural chemicals, drugs, dyes, detergents, fertilizers, cosmetics and sanitary items. Such a packaging material is used, by utilizing the water solubility of the film, in an application where a solution is obtained by directly putting the packaging material into an aqueous medium to be decomposed or dissolved, or an application where the packaging material unwrapped for use is directly discarded to be flushed away.

Conventionally, a polyvinyl alcohol-based film used for a packaging material is subjected, for matting or anti-blocking, to a satin finish treatment for forming a satin pattern on the surface thereof, or embossment for causing the film to have irregularities. For example, PTL1 to PTL3 disclose that a satin pattern having a surface roughness (Ra) of 0.1 to 8 μm and an irregularity pattern of 100 mesh or less having a depth of 50 to 300 μm are formed on a film surface for anti-blocking.

Here, in order to provide the irregularity pattern of 100 mesh or less having a depth of 50 to 300 μm, the embossment needs to be performed with coarse mesh, and according to PTL1 to PTL3, an irregularity shape of 100 mesh or less having a depth of 100 to 400 μm is engraved onto an embossing roll.

Besides, an inorganic particle is conventionally blended in a polyvinyl alcohol-based film used for a packaging material in some cases. For example, PTL4 discloses that 0.1 to 50 parts by mass of a filler is contained with respect to 100 parts by mass of a polyvinyl alcohol-based resin for obtaining a surface roughness (Ra) of 2 μm or less for the purpose of obtaining excellent concealment, mechanical strength and appearance.

CITATION LIST

Patent Literature

PTL1: JP 2002-347112 A
PTL2: JP 2002-361379 A
PTL3: JP 2002-361378 A
PTL4: JP 2002-146053 A

SUMMARY OF INVENTION

Technical Problem

In the case where irregularities are engraved onto an embossing roll with coarse mesh as in PTL1 to PTL3, however, the roll durability is reduced, and, when dirt or a foreign matter adheres to the film in the embossment for example, the irregularities on the embossing roll may be chipped in some cases.

Besides, a polyvinyl alcohol-based film is generally stored in a wound state, and when the film is stored at a high temperature for a long period of time, for example, in a storehouse in summer, blocking easily occurs. Therefore, a polyvinyl alcohol-based film provided with irregularities is required to have excellent blocking resistance even when stored at a high temperature for a long period of time.

On the other hand, when a filler is contained as in PTL4, the blocking resistance is presumed to be improved in general, but in the case of a storage at a high temperature for a long period of time, the filler may sediment to cause degradation of the blocking resistance in some cases.

The present invention was devised in consideration of these circumstances, and an object of the present invention is to obtain good blocking resistance of a polyvinyl alcohol-based water-soluble packaging film in a long-term high-temperature storage, and to obtain excellent durability of a roll used for subjecting the film to embossment. Besides, a restrictive object of the present invention is to improve, by using an inorganic particle, blocking resistance of a polyvinyl alcohol-based water-soluble packaging film in a long-term high-temperature storage, and to obtain excellent durability of a roll used for subjecting the film to embossment.

Solution to Problem

The present inventor has found, as a result of earnest studies, that good blocking resistance in a long-term high-temperature storage can be obtained and excellent roll durability can also be obtained by setting the surface roughness (Ra) and the maximum height (Rz) of a water-soluble film in prescribed ranges, resulting in accomplishing the following first aspect of the present invention. Specifically, the present invention provides the following [1] to [7]:

[1] A water-soluble packaging film comprising a polyvinyl alcohol resin, in which the water-soluble packaging film has, on a film surface thereof, irregularities having a surface roughness (Ra) of 0.3 to 1 μm and a maximum height (Rz) of 3 to 9 μm.

[2] The water-soluble packaging film according to [1] above, further comprising a plasticizer.

[3] The water-soluble packaging film according to [1] or [2] above, in which a content of the plasticizer is 3 to 25% by mass.

[4] The water-soluble packaging film according to any one of [1] to [3] above, in which the polyvinyl alcohol resin has a saponification degree of 80 to 99.9% by mol.

[5] The water-soluble packaging film according to any one of [1] to [4] above, in which the polyvinyl alcohol resin comprises an unmodified polyvinyl alcohol.

[6] A production method for a water-soluble packaging film, comprising forming irregularities on a film surface through matte embossment by causing a film comprising a polyvinyl alcohol resin to pass between a matte embossing roll and a backup roll,
in which the matte embossing roll has first irregularities engraved with 300 to 400 mesh and second irregularities formed by sandblast with 250 mesh or less.

[7] The production method for a water-soluble packaging film according to [6] above, in which the first irregularities are formed to have an engraving depth of less than 150 μm.

Besides, the present inventor has found, as a result of earnest studies on another aspect, that improved blocking resistance in a long-term high-temperature storage can be obtained and excellent roll durability can also be obtained by using a specific inorganic particle and setting the surface roughness (Ra) and the maximum height (Rz) of a water-soluble film in prescribed ranges, resulting in accomplishing the following second aspect of the present invention. Specifically, the present invention provides the following [8] to [17]:

[8] A water-soluble packaging film comprising a polyvinyl alcohol resin and an inorganic particle,
in which the inorganic particle has an average particle size of 1 to 10 μm and an oil absorption of 230 to 400 ml/100 g, and
the water-soluble packaging film has, on a film surface thereof, irregularities having a surface roughness (Ra) of 0.3 to 1 μm and a maximum height (Rz) of 3 to 9 μm.

[9] The water-soluble packaging film according to [8] above, in which a content of the inorganic particle is 0.3 to 6% by mass.

[10] The water-soluble packaging film according to [8] or [9] above, in which the polyvinyl alcohol resin comprises at least one polyvinyl alcohol resin selected from the group consisting of a pyrrolidone ring group-modified polyvinyl alcohol and a sulfonate group-modified polyvinyl alcohol.

[11] The water-soluble packaging film according to [10] above, in which a pyrrolidone ring group modification degree of the pyrrolidone ring group-modified polyvinyl alcohol is 0.1 to 20% by mol.

[12] The water-soluble packaging film according to [10] above, in which a sulfonate group modification degree of the sulfonate group-modified polyvinyl alcohol is 0.1 to 6% by mol.

[13] The water-soluble packaging film according to any one of [10] to [12] above, in which each of the pyrrolidone ring group-modified polyvinyl alcohol and the sulfonate group-modified polyvinyl alcohol has a saponification degree of 80 to 99.9% by mol.

[14] The water-soluble packaging film according to any one of [8] to [13] above, further comprising a plasticizer.

[15] The water-soluble packaging film according to [14] above, in which a content of the plasticizer is 3 to 25% by mass.

[16] A production method for a water-soluble packaging film, comprising forming irregularities on a film surface through matte embossment by causing a film comprising a polyvinyl alcohol resin and an inorganic particle to pass between a matte embossing roll and a backup roll,
in which the inorganic particle has an average particle size of 1 to 10 μm and an oil absorption of 230 to 400 ml/100 g, and
the matte embossing roll has first irregularities engraved with 300 to 400 mesh and second irregularities formed by sandblast with 250 mesh or less.

[17] The production method for a water-soluble packaging film according to [16] above, in which the first irregularities are formed to have an engraving depth of less than 150 μm.

Advantageous Effects of Invention

According to a first aspect of the present invention, a polyvinyl alcohol-based water-soluble packaging film having good blocking resistance in a long-term high-temperature storage can be provided and excellent durability of a roll used for subjecting the film to embossment can also be obtained.

According to a second aspect of the present invention, a polyvinyl alcohol-based water-soluble packaging film having blocking resistance improved by use of an inorganic particle in a long-term high-temperature storage can be provided and excellent durability of a roll used for subjecting the film to embossment can also be obtained.

DESCRIPTION OF EMBODIMENTS

The present invention will now be described in more detail with reference to embodiments, and it is noted that the present invention is not limited to the embodiments illustrated below.

[Water-Soluble Packaging Film]

A water-soluble packaging film according to a first aspect of the present invention is a water-soluble packaging film comprising a polyvinyl alcohol (hereinafter sometimes simply referred to as "PVA") resin, and having irregularities with a surface roughness (Ra) of the film surface of 0.3 to 1 μm and a maximum height (Rz) of 3 to 9 μm.

Besides, a water-soluble packaging film according to a second aspect of the present invention is a water-soluble packaging film comprising a polyvinyl alcohol (PVA) resin and an inorganic particle, and having irregularities with a surface roughness (Ra) of the film surface of 0.3 to 1 μm and a maximum height (Rz) of 3 to 9 μm.

Now, the water-soluble packaging films according to the first and second aspects will be described. It is noted that features common between the water-soluble packaging films of the first and second aspects will be described as a whole in the following description, unless otherwise specified.

In the present invention, when either of the surface roughness (Ra) and the maximum height (Rz) is lower than the above-described lower limit value, blocking resistance is degraded, for example, in storage under a high temperature environment for a long period of time. Besides, when either of these exceeds the above-described upper limit value, irregularities of an embossing roll used for forming the irregularities on the film surface become coarser than necessary, and hence, durability of the embossing roll is reduced and the irregularities of the embossing roll are easily chipped or abraded.

In the first aspect, from the viewpoint of obtaining both excellent roll durability and excellent blocking resistance, the surface roughness (Ra) is preferably 0.33 to 0.9 μm, and more preferably 0.34 to 0.7 μm. Besides, the maximum height (Rz) is preferably 3.3 to 8.3 μm, and more preferably 3.4 to 7.0 μm. It is noted that either surface of the water-soluble packaging film may have the surface roughness (Ra) and the maximum height (Rz) with said ranges.

In the second aspect, from the viewpoint of obtaining both excellent roll durability and excellent blocking resistance, the surface roughness (Ra) is preferably 0.33 to 0.95 μm, and more preferably 0.34 to 0.9 μm. Besides, the maximum height (Rz) is preferably 3.3 to 8.3 μm, and more preferably 3.4 to 7.0 μm. It is noted that either surface of the water-soluble packaging film may have the surface roughness (Ra) and the maximum height (Rz) with said ranges.

In each of these aspects, the shape of the irregularities on the film surface is not especially limited, and for example, a combination of irregularities formed by arranging a large number of relatively coarser projections in a pyramid, trapezoid, hexagonal, or diagonal-line shape or the like, and relatively finer random irregularities may be employed. Incidentally, the coarser irregularities are formed using first irregularities of the embossing roll described later, and the finer irregularities are formed using second irregularities formed by a sandblast method.

(Inorganic Particle)

The water-soluble packaging film of the second aspect of the present invention comprises the inorganic particle. The inorganic particle has an average particle size of 1 to 10 μm and an oil absorption of 230 to 400 ml/100 g.

In the second aspect of the present invention, when one having an oil absorption less than 230 ml/100 g is used, the inorganic particle sediments in a long-term high-temperature storage, and good blocking resistance in a long-term high-temperature storage cannot be obtained. On the other hand, one having an oil absorption larger than 400 ml/100 g is difficult to obtain.

Besides, when the average particle size of the inorganic particle is larger than 10 μm, the embossing roll may be damaged or chipped by the inorganic particle, which may reduce the roll durability in some cases. Furthermore, when it is larger than 10 μm, a filter used in forming the film or the like is easily clogged, and when a coarse filter is used to fit with the average particle size of the inorganic particle, it is apprehended that a foreign matter may be mixed into the water-soluble packaging film. In addition, even when one having an average particle size smaller than 1 μm is used, good blocking resistance is hardly obtained by using such an inorganic particle.

From the viewpoint of obtaining excellent blocking resistance in a long-term high-temperature storage, in the second aspect of the present invention, the oil absorption is preferably 240 ml/100 g or more, and more preferably 250 ml/100 g or more. Besides, the oil absorption of the inorganic particle is preferably 380 ml/100 g or less, and more preferably 350 ml/100 g or less.

Furthermore, the average particle size of the inorganic particle is preferably 2 μm or more, more preferably 3 μm or more, preferably 9 μm or less, and more preferably 8 μm or less.

Incidentally, the average particle size of the inorganic particle herein refers to one measured using a laser diffraction particle size distribution measuring apparatus. Besides, the oil absorption is one measured by a method according to JIS K5101-13-1 "Test Methods for Pigments—Part 13: Oil Absorption".

The inorganic particle is not especially limited, and examples include silica, clay, kaolin, aluminum hydroxide, calcium carbonate, titanium dioxide, barium sulfate, satin white, talc, aluminum oxide and zirconia. Among these, silica is preferred.

A content of the inorganic particle in the water-soluble packaging film according to the second aspect is preferably 0.3 to 6% by mass based on the whole amount of the water-soluble packaging film. When the content of the inorganic particle is 0.3% by mass or more, the blocking resistance can be effectively improved by the inorganic particle. The content of the inorganic particle is more preferably 0.4% by mass or more and further preferably 0.5% by mass or more for obtaining further better blocking resistance.

Besides, when it is 6% by mass or less, the effect commensurate with the blending amount can be attained without causing sedimentation of the inorganic particle or the like. The content of the inorganic particle is more preferably 5% by mass or less, and further preferably 4% by mass or less.

On the other hand, the water-soluble packaging film according to the first aspect of the present invention may not comprise the inorganic particle.

(Polyvinyl Alcohol Resin)

The water-soluble packaging film according to each aspect of the present invention comprises the polyvinyl alcohol resin (PVA resin). The PVA resin is obtained by obtaining a polymer through polymerization of a vinyl ester by a known method, and saponifying, namely, hydrolyzing, the thus obtained polymer. An alkali or an acid is generally used in saponification, and an alkali is preferably used. One kind of PVA resin may be used singly, or two or more kinds may be used together.

Examples of the vinyl ester include vinyl acetate, vinyl formate, vinyl propionate, vinyl butyrate, vinyl pivalate, vinyl versatate, vinyl laurate, vinyl stearate and vinyl benzoate. A polymerization method for the vinyl ester is not especially limited, and examples include a solution polymerization method, a bulk polymerization method and a suspension polymerization method.

The PVA resin may be an unmodified PVA or a modified PVA. The unmodified PVA can be obtained by saponifying a polyvinyl ester. The modified PVA can be obtained by saponifying a copolymer of a vinyl ester and a different unsaturated monomer.

The different unsaturated monomer can be a monomer excluding a vinyl ester and having a carbon-carbon double bond such as a vinyl group, and examples include olefins, (meth)acrylic acids and salts thereof, (meth)acrylates, unsaturated acids excluding (meth)acrylic acids, and salts and esters thereof, (meth)acrylamides, N-vinylamides, vinyl ethers, nitriles, vinyl halides, an allyl compound, a vinyl silyl compound, isopropenyl acetate, a sulfonate group-containing compound, and an amino group-containing compound.

Examples of the olefins include ethylene, propylene, 1-butene and isobutene. Examples of the (meth)acrylates include methyl (meth)acrylate, ethyl (meth)acrylate, n-propyl (meth)acrylate, i-propyl (meth)acrylate, n-butyl (meth)acrylate and 2-ethylhexyl (meth)acrylate.

Examples of the unsaturated acids excluding (meth)acrylic acids, and salts and esters thereof include maleic acid and salts thereof, a maleic acid ester, itaconic acid and salts thereof, an itaconic acid ester, methylenemalonic acid and salts thereof, and a methylenemalonic acid ester.

Examples of the (meth)acrylamides include acrylamide, n-methylacrylamide, N-ethylacrylamide and N,N-dimethylacrylamide. An example of the N-vinylamides includes N-vinylpyrrolidone. Examples of the vinyl ethers include methyl vinyl ether, ethyl vinyl ether, n-propyl vinyl ether, i-propyl vinyl ether and n-butyl vinyl ether.

An example of the nitriles includes (meth)acrylonitrile. Examples of the vinyl halides include vinyl chloride and vinylidene chloride. Examples of the allyl compound include allyl acetate and allyl chloride. An example of the vinyl silyl compound includes vinyltrimethoxysilane.

Examples of the sulfate group-containing compound include (meth)acrylamide alkanesulfonic acid, such as (meth)acrylamide propanesulfonic acid, and salts thereof, and olefin sulfonic acid, such as ethylenesulfonic acid, allylsulfonic acid and methallylsulfonic acid, and salts thereof.

Examples of the amino group-containing compound include allylamine, polyoxyethylene allylamine, polyoxypropylene allylamine, polyoxyethylene vinylamine and polyoxypropylene vinylamine.

Besides, the modified PVA may be a PVA having a carboxyl group, a sulfonate group, an amino group, a pyrrolidone group or the like added thereto by graft polymerization or the like.

The modified PVA is preferably one modified particularly with at least one hydrophilic group selected from the group consisting of a sulfonate group, a pyrrolidone ring group, an amino group and a carboxyl group. In other words, specific preferable examples of the modified PVA include a sulfonate group-modified PVA, a pyrrolidone ring-group modified PVA, an amino group-modified PVA and a carboxyl group-modified PVA. It is noted that such hydrophilic groups include, in addition to these functional groups, salts, such as sodium salt and potassium salt, of these functional groups.

The hydrophilic group is more preferably a sulfonate group or a pyrrolidone ring group, and in other words, the modified PVA is more preferably a sulfonate group-modified PVA or a pyrrolidone ring group-modified PVA.

The sulfonate group-modified PVA is not especially limited as long as a sulfonate group is introduced thereinto by modification, and the sulfonate group is preferably bonded to a polymer main chain through a linking group. Examples of the linking group include an amide group, an alkylene group, an ester group and an ether group. In particular, a combination of an amide group and an alkylene group is preferred. In order to use, as the linking group, such a combination of an amide group and an alkylene group, the aforementioned (meth)acrylamide alkanesulfonic acid or a salt thereof may be used as the unsaturated monomer.

Besides, the sulfonate group preferably comprises a sulfonate, and is particularly preferably a sodium sulfonate group. When the modified PVA is a sodium sulfonate-modified PVA, the sodium sulfonate-modified PVA preferably comprises a constitutional unit represented by the following formula (1):

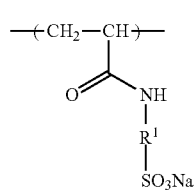
(1)

wherein $R^1$ represents an alkylene group having 1 to 4 carbon atoms.

The pyrrolidone ring group-modified PVA is not especially limited as long as a pyrrolidone ring is introduced thereinto by modification, and preferably comprises a constitutional unit represented by the following formula (2). In order to obtain a pyrrolidone ring group-modified PVA comprising such a constitutional unit, for example, N-vinylpyrrolidone may be used as the different unsaturated monomer.

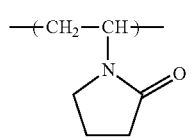
(2)

Besides, the amino group-modified PVA is not especially limited as long as an amino group is introduced thereinto by modification, and preferably comprises a constitutional unit represented by the following formula (3):

(3)

wherein $R^2$ represents a single bond or an alkylene group having 1 to 10 carbon atoms.

Furthermore, the carboxyl group-modified PVA is not especially limited as long as a carboxyl group is introduced thereinto by modification, and preferably comprises a constitutional unit represented by the following formula (4-1), (4-2) or (4-3):

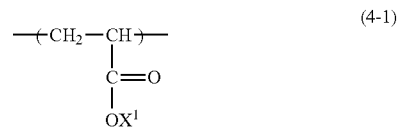
(4-1)

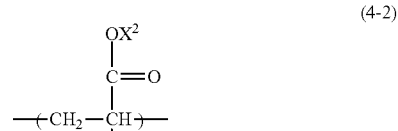
(4-2)

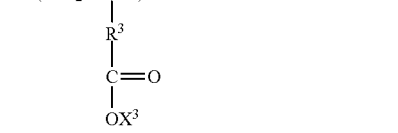
(4-3)

wherein $X^1$, $X^2$, $X^3$, $X^4$ and $X^5$ each independently represent a hydrogen atom, a metal atom or a methyl group. In other words, the carboxyl group herein includes a salt and a methyl ester of a carboxyl group. An example of the metal atom includes a sodium atom. In the formula (4-2), $R^3$ represents an alkylene group having 1 to 10 carbon atoms.

The modified PVA modified with at least one hydrophilic group selected from the group consisting of a sulfonate group, a pyrrolidone ring group, an amino group and a carboxyl group has a hydrophilic group modification degree of, for example, 0.1 to 20% by mol.

More specifically, from the viewpoint of improving chemical resistance and water solubility, a sulfonate group modification degree of the sulfonate group-modified PVA is preferably 0.1 to 6% by mol, and more preferably 1 to 5% by mol. Besides, from the same viewpoint, a pyrrolidone ring group modification degree of the pyrrolidone ring group-modified PVA is preferably 0.1 to 20% by mol, more preferably 0.5 to 10% by mol, and further preferably 1 to 5% by mol.

Incidentally, the hydrophilic group modification degree, the sulfonate group modification degree or the pyrrolidone ring group modification degree means a ratio of the number of moles of the hydrophilic group, the sulfonate group or the pyrrolidone ring group to the total number of moles of constitutional units of the modified PVA.

A saponification degree of the PVA resin is preferably 80 to 99.9% by mol. When the saponification degree falls in this range, the water solubility required of the water-soluble packaging film can be easily attained.

Besides, the preferable range of the saponification degree of the PVA resin varies depending on whether or not the resin is modified, and the type of a group used for the modification. For example, the saponification degree of, for example, an unmodified PVA is preferably 80 to 99.9% by mol as described above, and from the viewpoint of further improving the water solubility, the saponification degree is more preferably 80 to 95% by mol, and further preferably 85 to 92% by mol.

On the other hand, the saponification degree of a modified PVA such as a pyrrolidone ring group-modified PVA or a sulfonate group-modified PVA is preferably 80 to 99.9% by mol as described above, and from the viewpoint of improving the chemical resistance and the water solubility in a well-balanced manner, the saponification degree is more preferably 85 to 99% by mol, and further preferably 90 to 98% by mol.

The saponification degree is measured in accordance with JIS K6726. The saponification degree refers to a ratio of units actually saponified into vinyl alcohol units among units to be converted into a vinyl alcohol unit through the saponification.

A method for adjusting the saponification degree is not especially limited. The saponification degree can be adjusted appropriately by selecting conditions for the saponification, namely, conditions for hydrolysis.

A polymerization degree of the PVA is not especially limited, and is preferably 400 or more, more preferably 700 or more, and further preferably 900 or more. Besides, the polymerization degree is preferably 2000 or less, more preferably 1800 or less, and further preferably 1500 or less. When the polymerization degree is equal to or larger than the lower limit value and equal to or smaller than the upper limit value, the viscosity of a PVA aqueous solution used in forming the water-soluble packaging film can be adequate, and good water solubility of the PVA resin can be easily obtained. Besides, the water-soluble packaging film can be easily provided with good strength. It is noted that the polymerization degree is measured in accordance with JIS K6726.

When in the form of a 4% by mass aqueous solution, the PVA has a viscosity, measured at 20° C., of preferably 3 mPa·s or more, and more preferably 8 mPa·s or more. Besides, the viscosity is preferably 30 mPa·s or less, and more preferably 20 mPa·s or less. It is noted that such a viscosity can be measured in accordance with JIS K6726.

In the first aspect of the present invention, the PVA resin preferably comprises an unmodified PVA. In the present invention, when an unmodified PVA is used, more excellent blocking resistance can be obtained. Besides, when an unmodified PVA is used, the unmodified PVA alone may be used as the PVA, and the unmodified PVA may be used together with a modified PVA.

In the first aspect, from the viewpoint of obtaining good blocking resistance, a content of the unmodified PVA in the PVA resin is preferably 50 to 100% by mass, more preferably 70 to 100% by mass, and further preferably 90 to 100% by mass, based on the whole amount of the PVA resin, and the unmodified PVA alone is particularly preferably used as the PVA resin.

In the second aspect of the present invention, the PVA resin preferably comprises a modified PVA. The modified PVA is preferably one modified with a hydrophilic group as described above, and in particular, from the viewpoint of obtaining good chemical resistance and good water solubility, one modified with a sulfonate group or a pyrrolidone ring group is more preferred. In other words, the PVA resin more preferably comprises one of or both of a sulfonate group-modified PVA and a pyrrolidone ring group-modified PVA. Among these, from the viewpoint of obtaining more excellent water solubility, a sulfonate group-modified PVA is further preferred, and from the viewpoint of obtaining more excellent chemical resistance, a pyrrolidone ring group-modified PVA is further preferred.

Furthermore, when the PVA resin comprises a modified PVA such as a sulfonate group-modified PVA or a pyrrolidone ring group-modified PVA, it is apprehended that the resultant water-soluble packaging film may be viscous and hence the blocking resistance may be degraded, but according to the present invention, the water-soluble packaging film comprises the inorganic particle, so as to prevent the degradation of the blocking resistance otherwise degraded in using the modified PVA.

The PVA resin preferably comprises one of or both of the sulfonate group-modified PVA and the pyrrolidone ring group-modified PVA as described above. In the second aspect, a sum of the contents of these is preferably 30 to 100% by mass, more preferably 35 to 100% by mass, and further preferably 50 to 100% by mass, based on the whole amount of the PVA resin. When the water-soluble packaging film comprises one of or both of the sulfonate group-modified PVA and the pyrrolidone ring group-modified PVA in prescribed or larger amounts in this manner, excellent chemical resistance and excellent water solubility can be obtained.

Incidentally, the sulfonate group-modified PVA and the pyrrolidone ring group-modified PVA may be used together with the unmodified PVA, or together with a different modified PVA, and needless to say, may be used singly.

In each aspect of the present invention, the water-soluble packaging film is constituted mainly by the PVA resin. A content of the PVA resin is, specifically based on the whole amount of the water-soluble packaging film, preferably 70% by mass or more, more preferably 75% by mass or more, and further preferably 80% by mass or more. Besides, the content of the PVA resin is preferably 97% by mass or less, more preferably 95% by mass or less, and further preferably 93% by mass or less. When the content of the PVA resin is equal to or larger than the lower limit, the water-soluble packaging film can easily obtain good water solubility. Besides, when the content is equal to or smaller than the upper limit value, additives such as an inorganic particle and a plasticizer can be appropriately blended in the water-soluble packaging film.

(Plasticizer)

The water-soluble packaging film according to each aspect of the present invention preferably further comprises a plasticizer. When the water-soluble packaging film comprises a plasticizer, for example, a glass transition point thereof is lowered so that durability at a low temperature can be improved. Besides, the water solubility of the water-soluble packaging film can be also improved.

The plasticizer is not especially limited, and examples include polyhydric alcohols such as glycerin, diglycerin, diethylene glycol, trimethylolpropane, triethylene glycol, dipropylene glycol and propylene glycol, polyethers such as polyethylene glycol and polypropylene glycol, phenol derivatives such as bisphenol A and bisphenol S, an amide compound such as N-methylpyrrolidone, a compound obtained by adding ethylene oxide to polyhydric alcohol such as glycerin, pentaerythritol or sorbitol, and water. One of these may be used singly, or two or more of these may be used, and it is preferable that two or more of these are used.

Among the above-described plasticizers, since the water solubility can be improved, glycerin, trimethylolpropane, polyethylene glycol, polypropylene glycol, triethylene glycol, dipropylene glycol and propylene glycol are preferred, and since the effect of improving the water solubility is great, glycerin and trimethylolpropane are particularly preferred.

A molecular weight of the plasticizer is preferably 90 or more, more preferably 92 or more, preferably 1200 or less, and more preferably 1000 or less.

A content of the plasticizer is preferably 3 to 25% by mass, based on the whole amount of the water-soluble packaging film. When the content of the plasticizer is 3% by mass or more, the effect of blending the plasticizer can be easily obtained. Besides, when the content is 25% by mass or less, bleed out of the plasticizer is reduced, and good blocking resistance is obtained. The content of the plasticizer is more preferably 5% by mass or more, and further preferably 7% by mass or more. Besides, the content is more preferably 22% by mass or less, and further preferably 17% by mass or less.

(Other Additives)

The water-soluble packaging film of the present invention may further appropriately comprise, if necessary, additives usually used in a PVA film, such as a colorant, a perfume, an antifoaming agent, a release agent and a UV absorber.

The thickness of the water-soluble packaging film of the present invention is not especially limited, and is, for example, 5 to 150 μm. When the thickness is equal to or larger than the lower limit, the strength of the film can be increased. Besides, when it is equal to or smaller than the upper limit, the packaging ability and the heat-sealing ability as a packaging film become good, and the productivity is improved.

From these points of view, the thickness of the water-soluble packaging film according to the first aspect is preferably 10 μm or more, and more preferably 15 μm or more. Besides, the thickness is preferably 100 μm or less, and more preferably 80 μm or less.

Furthermore, from the above-described viewpoints, the thickness of the water-soluble packaging film according to the second aspect is preferably 10 μm or more, and more preferably 15 μm or more. Besides, the thickness is preferably 100 μm or less, and more preferably 90 μm or less.

The water-soluble packaging film of the present invention is used for packaging various materials, and is suitably used as an agent packaging film for wrapping various agents such as agricultural chemicals, industrial chemicals, dyes, detergents, fertilizers, cosmetics, sanitary items and pharmaceuticals.

[Production Method for Water-Soluble Packaging Film]

As a production method for the water-soluble packaging film of the present invention, a method in which a PVA film comprising a PVA resin, or a PVA resin and an inorganic particle is first formed, and the resultant PVA film is subjected to matte embossment for forming irregularities on the film surface is employed.

(Formation of PVA Film)

A method for forming a PVA film is not especially limited, and an example includes a method in which a PVA aqueous solution obtained by diluting, with water, a PVA and an additive such as a plasticizer added if necessary, or a PVA, an inorganic particle and an additive such as a plasticizer added if necessary is flow-casted on a support member, and the resultant is dried to form a film. Besides, the PVA aqueous solution may be flow-casted after appropriately passing through a filter.

Examples of a method for flow-casting the PVA aqueous solution on the support member include a casting method, a roll coating method, a lip coating method, a spin coating method, a screen coating method, a fountain coating method, a dipping method and a spray method.

The PVA aqueous solution is obtained by diluting, with water, components excluding water in a concentration, based on the whole amount of the aqueous solution, of preferably 35% by mass or less, more preferably 25% by mass or less, and further preferably 20% by mass or less. Besides, the components excluding water may be diluted with water in a concentration of preferably 8% by mass or more, more preferably 10% by mass or more, and further preferably 12% by mass or more.

When the concentration falls in the above-described range, the viscosity of the PVA aqueous solution becomes so appropriate that the PVA aqueous solution can be easily flow-casted. Furthermore, when the concentration is equal to or higher than the lower limit value, drying time is shortened, and the resultant water-soluble packaging film with good quality can be easily obtained.

The support member is not limited as long as it can keep the PVA aqueous solution on the surface thereof in flow-casting the PVA aqueous solution, and can support a PVA film thus obtained. Examples of a material of the support member include polyolefin, polyester and an acrylic resin, and a support member made of another material may be used. Besides, the support member may be in the shape of a sheet or a film, and may be in another shape. It is noted that the PVA film formed on the support member is peeled off from the support member before performing the matte embossment described later.

Drying performed after flow-casting the PVA aqueous solution may be performed by any method, and examples include a natural drying method, and a method in which heat drying is performed at a temperature equal to or lower than the glass transition temperature of the PVA resin.

(Matte Embossment)

The matte embossment employed in the present production method is performed by causing the PVA film to pass between a matte embossing roll and a backup roll. As the matte embossing roll, one having first irregularities engraved with 300 to 400 mesh and second irregularities formed by sandblast with 250 mesh or less is used.

In the present production method, when the engraving for forming the first irregularities is performed with less than 300 mesh, the irregularities of the embossing roll are so coarse that the roll durability is reduced to easily cause chipping or the like in the roll. Besides, the maximum height (Rz) and the surface roughness (Ra) of the water-soluble packaging film described above may become too large. On the other hand, when the engraving is performed with larger than 400 mesh, the maximum height (Rz) and the surface roughness (Ra) of the water-soluble packaging film are liable to be lower than the above-described lower limit values.

Besides, when the sandblast is performed with larger than 250 mesh, the surface roughness (Ra) or the maximum height (Rz) of the water-soluble packaging film is reduced and difficult to be adjusted within the above-described range. Furthermore, since the two types of irregularities, namely, the first irregularities and the second irregularities, are formed on the embossing roll in the present production method, the roll is difficult to be chipped or abraded, and good roll durability is obtained.

Besides, when the irregularities are formed on the film surface by the above-described matte embossment, the shape of the irregularities on the film surface can be easily kept even when the film is stored for a long period of time under a high temperature environment.

From the viewpoints of adjusting the surface roughness (Ra) and the maximum height (Rz) of the water-soluble packaging film within the desired ranges and obtaining good roll durability, the engraving for forming the first irregularities is performed preferably with 350 mesh or more. Besides, from the viewpoint of easily adjusting the surface roughness (Ra) and the maximum height (Rz) of the water-soluble packaging film within the desired ranges, the engraving for forming the first irregularities is performed preferably with 390 mesh or less.

Furthermore, from the viewpoint of easily adjusting the maximum height (Rz) and the surface roughness (Ra) of the water-soluble packaging film within the desired ranges, the sandblast is performed preferably with 200 mesh or less, and more preferably 100 mesh or less. Besides, the sandblast is performed preferably with 20 mesh or more, and more preferably 40 mesh or more.

In the present production method, a depth of the engraving for forming the first irregularities is preferably less than 150 μm. When the depth is less than 150 μm, the roll durability is improved and roll chipping or the like is hardly caused. Besides, the maximum height (Rz) and the surface roughness (Ra) of the water-soluble packaging film can be easily adjusted to be equal to or smaller than the upper limit values. From these points of view, the depth of the engraving is more preferably 120 μm or less, and further preferably 80 μm or less.

Besides, the depth of the engraving is preferably 10 μm or more, more preferably 20 μm or more, and further preferably 50 μm or more. When the depth of the engraving is larger than these lower limit values, the maximum height (Rz) and the surface roughness (Ra) of the water-soluble packaging film can be easily adjusted to be equal to or larger than the lower limit values.

The engraving for forming the first irregularities is not especially limited, and may be performed by pressure engraving by any of known methods such as mill graving, photo-graving and machine graving, among which mill graving is preferred. Besides, the engraving shape is not especially limited, and an arrangement of a large number of recesses each in a pyramid shape, trapezoid cross-section, hexagonal shape, diagonal-line or the like is employed.

Besides, the sandblast method for forming the second irregularities may be performed by, for example, blowing sand or an abrasive against the roll.

The first and second irregularities may be formed, in general, uniformly on the surface of the roll. On the matte embossing roll, the first irregularities may be formed after forming the second irregularities, but the second irregularities are formed preferably after forming the first irregularities. When the second irregularities are formed after the first irregularities, the roll durability is further improved, and a uniform irregularity pattern can be formed.

The matte embossing roll may have, on its surface, a plating layer formed by chrome plating or nickel chrome plating process or the like. When a plating layer is formed, the roll durability is further improved. A thickness of the plating layer is not especially limited, and is, for example, 1 to 1000 μm, preferably 3 to 250 μm, and more preferably 5 to 30 μm.

The plating layer may be formed, for example, after performing the engraving for forming the first irregularities. Besides, the plating layer is formed preferably after forming the first irregularities and before forming the second irregularities, and when it is formed at this timing, the second irregularities are formed on the plating layer.

The backup roll used in the matte embossment may be any roll used in general matte embossment, and for example, a rubber roll having rubber on the roll surface may be used. The hardness of the roll surface of the rubber roll is not especially limited, and is, for example, hardness A of 60 to 950, and preferably 70 to 950. It is noted that hardness A refers to durometer hardness defined in JIS K6253-3.

In the matte embossment, the matte emboss may be heated to, for example, 50 to 150° C., and preferably 80 to 120° C. On the other hand, the backup roll may be heated or may be kept around room temperature (23° C.) without heating. Specifically, the temperature of the backup roll may be, for example, about 5 to 50° C. Besides, the matte emboss may be pressed against the backup roll at a pressing force (linear pressure) of, for example, 40 to 250 kg/cm, and preferably 50 to 200 kg/cm.

Furthermore, the PVA film may be caused to pass between the matte emboss and the backup roll at a speed of, for example, 1 to 50 m/min, and preferably 5 to 20 m/min.

The matte embossment may be performed in-line or off-line. When it is performed in-line, after forming the PVA film from the PVA solution, the matte embossment is performed on the same production line without winding the PVA film.

On the other hand, when it is performed off-line, the PVA film is formed from the PVA solution, wound up into a roll shape once, and fed from the roll to be subjected to the matte embossment. In an off-line state, the PVA film rolled up into a roll shape may be with the underlying support member wound together, and even in this case, the PVA film may be peeled off from the support member after feeding and before performing the matte embossment.

In either case of in-line and off-line production, after the matte embossment, the film is, for example, rolled up into a roll shape to be stored in a storehouse or the like in the roll shape.

In the present production method, the PVA film may be subjected to stretching. The stretching may be performed before the matte embossment or after the matte embossment. When it is performed before the matte embossment, it may be performed during the drying following the flow-casting, or may be performed after the drying. A method for stretching can be, for example, stretching using a roll, stretching using a tenter, stretching using a winding device, stretching using drying shrinkage, or stretching using any combination of these. The stretching may be performed at a stretching ratio of, for example, about 1.05 to 3. Besides, another known treatment performed on a film, such as annealing process, may be appropriately performed.

EXAMPLES

The present invention will be described in further detail with reference to following Examples, and it is noted that the present invention is not restricted by the Examples at all.

Evaluation methods for a water-soluble packaging film are as follows:

[Surface Roughness (Ra) and Maximum Height (Rz)]

An obtained water-soluble packaging film was allowed to stand under an environment of 23° C. and 50% RH for 4 hours, and then a surface roughness (Ra) and a maximum height (Rz) were measured three times along a TD direction of the film at a measurement speed of 0.060 mm/sec., with a measurement length of 4 mm and a measurement range of ±64 µm in accordance with JIS B0601-2001. Averages of the thus measured three values were respectively defined as the surface roughness (Ra) and the maximum height (Rz) of the film.

[Change-with-Time of Surface State]

An obtained water-soluble packaging film was put in an aluminum bag, and the resultant was allowed to stand at 50° C. for 2 weeks. Thereafter, the film was taken out of the aluminum bag, then the surface roughness (Ra) and the maximum height (Rz) were measured three times along the TD direction of the film in the same manner as described above, and averages of the thus measured three values were respectively defined as the surface roughness (Ra) and the maximum height (Rz) after the time course. Besides, ratios of the surface roughness (Ra) and the maximum height (Rz) after the time course to the surface roughness and the maximum height (Rz) before the time course were calculated respectively as an Ra ratio and an Rz ratio.

[Blocking Resistance]

An obtained water-soluble packaging film was cut into an A4 size, two sheets of the cut films were caused to adhere to each other with a 2 kgf roller, and the resultant was put in an aluminum bag to be vacuum sealed. The resultant aluminum bag was sandwiched between aluminum plates having a thickness of 2 mm (A4 size), weights were uniformly placed thereon to obtain 250 kgf/m2, and the resultant was allowed to stand at 50° C. for 68 hours. Thereafter, the resultant was allowed to stand at 23° C. and 50% RH for another 3 hours, the two sheets of the water-soluble packaging film adhering to each other were cut into a size of 15 cm×20 cm, and a 180 degree peeling force of the water-soluble packaging film was measured under conditions of a temperature of 23° C., 50% RH and a peeling speed of 100 mm/min, so as to evaluate the blocking resistance as follows:

A: 0.3 N/15 mm or less
B: over 0.3 N/15 mm but 0.4 N/15 mm or less
C: over 0.4 N/15 mm.

[Foreign Matter on Appearance]

An obtained water-soluble packaging film was cut into a size of a length of 0.2 m×a width of 0.3 m. Ten sheets of the film thus cut were observed with a stereo microscope (manufactured by SELMIC, tradename "SE-1300"). Presence of a foreign matter having a diameter of 1 to 20 µm was evaluated based on the following criteria:

A: There is no foreign matter.
B: There is one or more foreign matters.

[Solubility Test]

The solubility of a water-soluble packaging film was evaluated based on the following rapid solubility and water solubility obtained after a chemical resistance test.

(Rapid Solubility)

An obtained water-soluble packaging film was exposed to an environment of a temperature of 23° C. and 50% RH for 24 hours. Thereafter, the water-soluble packaging film was cut into a size of 35 mm×40 mm, and was fixed on a jig. Then, 500 ml of water was put into a 500 ml beaker, and while stirring the water with a stirrer in such a manner that a lower end of a swirl thus formed reached a scale-mark of 400 ml, and while keeping the water temperature at 20° C., the film fixed on the jig was dipped into the water. Time at which the film was penetrated by the jig and broken (break time) and time when residue of the film could not be visually found (solution time) were measured to be evaluated based on the following criteria:

<Break Time>
1: less than 11 seconds
2: 11 seconds or more and less than 16 seconds
3: 16 seconds or more <Solution Time>
1: less than 30 seconds
2: 30 seconds or more and less than 40 seconds
3: 40 seconds or more (Water Solubility after Chemical Resistance Test)

An obtained water-soluble packaging film was folded in two, and three ends were heat sealed to prepare a bag having a size of 5 cm×4 cm and having one end opened. The thus obtained bag was charged with 20 g of an agent containing 15 to 20% by mass of magnesium sulfate (manufactured by Walex, tradename "Porta-Pak Toilet Deodorizer") and the open end was heat sealed, and thus, a package holding a powder of magnesium sulfate therein was obtained. The thus obtained package was allowed to stand under an environment of 23° C.×50% RH for 24 hours so as to cause the film to sufficiently absorb water, and then, the resultant package was put in a tube sealing container (manufactured by Sansho Co., Ltd., tradename "PTFE Inner Cylinder Sealed Container equipped with Metal Valve for SR-50) and the tube sealing container was tightly sealed up so that water and a plasticizer could not be scattered from the package. Thereafter, the resultant was allowed to stand in an oven at a temperature of 40° C. for 2 months, and then, the package was opened to take out the packaged substance, and thus, a chemical resistance evaluation film was obtained.

The thus obtained chemical resistance evaluation film was cut into a size of 30 mm×30 mm and weighed, and then fixed on a jig. Then, 500 ml of water was put into a 500 ml beaker, and while stirring the water with a stirrer in such a manner that a lower end of a swirl thus formed reached a scale mark of 400 ml, and while keeping the water temperature at 23° C., the chemical resistance evaluation film fixed on the jig was dipped into the water for 10 minutes to be evaluated based on the following criteria:

1: No residue was found.
2: Residue was found.

[Roll Durability]

The matte embossment in which a PVA film was allowed to pass between the matte embossing roll and the backup roll was performed for 100 hours in total under conditions of each of Examples and Comparative Examples, and the durability of the matte embossing roll was evaluated based on the following criteria:

A: The surface of the matte embossing roll is free from defect.
B: The surface of the matte embossing roll is visually found to be chipped or damaged.

Components used in the Examples and the Comparative Examples are as follows:

PVA (1): unmodified PVA, polymerization degree: 1300, saponification degree: 88.0% by mol, viscosity of 4% by mass aqueous solution (20° C.): 14 mPa·s PVA (2): sulfonate group-modified PVA, polymerization degree: 1200, saponification degree: 95.4% by mol, sulfonate group modification degree: 4% by mol, viscosity of 4% by mass aqueous solution (20° C.): 12.1 mPa·s PVA (3): pyrrolidone ring group-modified PVA, polymerization degree: 1000, saponification degree: 95.8% by mol, pyrrolidone ring group modification degree: 4% by mol, viscosity of 4% by mass aqueous solution (20° C.): 10 mPa·s GL: glycerin, reagent, manufactured by Wako Pure Chemical Industries Ltd., molecular weight: 92

TMP: trimethylolpropane, reagent, manufactured by Wako Pure Chemical Industries Ltd., molecular weight: 134

Inorganic particle A: silica, SYLOID C803 (tradename, manufactured by Grace), average particle size: 3 μm, oil absorption: 300 ml/100 g Inorganic particle B: silica, Silysia 358 (tradename, manufactured by Fuji Silysia Chemical Ltd.), average particle size: 3.9 μm, oil absorption: 320 ml/100 g Inorganic particle C: silica, SYLOID 222 (tradename, manufactured by Grace), average particle size: 8 μm, oil absorption: 260 ml/100 g Inorganic particle D: silica, SYLOID 161 (tradename, manufactured by Grace), average particle size: 6 μm, oil absorption: 180 ml/100 g Inorganic particle E: silica, SYLOID C812 (tradename, manufactured by Grace), average particle size: 12 μm, oil absorption: 300 ml/100 g Example 1

[Production of Matte Embossing Roll]

A roll having a roll surface of iron was subjected to pressure engraving to form a diagonal-line shape having a depth of 60 μm by the mill graving with #380 mesh as shown in Table 1, and thereby, first irregularities were formed. Thereafter, a chrome plating layer of about 5 μm was formed thereon. Subsequently, second irregularities were formed on the surface of the chrome plating layer by the sandblast method with #60 mesh, and thus, a matte embossing roll was obtained.

[Preparation of PVA Film]

A PVA aqueous solution having a concentration of 15% by mass was prepared by dissolving and dispersing, in water, 84.5% by mass of a PVA resin, 13% by mass of glycerin used as a plasticizer, and 2.5% by mass of trimethylolpropane based on the amount of a resultant water-soluble packaging film, as shown in Table 1.

The thus obtained PVA aqueous solution was caused to pass through a filter having an opening of 20 μm, and then applied on a polyethylene terephthalate (PET) film (thickness: 50 μm) used as a support member by the lip coating method. Thereafter, the resultant was dried at 70° C. for 10 minutes, and then at 110° C. for 10 minutes to form a PVA film (thickness: 50 μm) on the support member. A laminate thus consisting of the support member and the PVA film was wound up around a paper core having an inner diameter of 3 inches.

[Matte Embossment]

The wound laminate was fed from the roll, the support member was peeled off, and then, the resultant PVA film was subjected to the matte embossment using the matte embossing roll and a backup roll (rubber roll manufactured by Yurirol Co., Ltd. (having a surface coated with synthetic rubber, hardness A: 90°)), and thus, a water-soluble packaging film having a thickness of 50 μm was obtained. The matte embossment was performed by causing the PVA film to pass between the matte embossing roll heated to 100° C. and the backup roll at ordinary temperature under pressure of a pressing force of 100 kg/cm at a speed of 10 m/min. Evaluation results of the obtained water-soluble packaging film are shown in Table 2.

Example 2

This Example was performed in the same manner as Example 1, except that the composition of a PVA aqueous solution was changed, as shown in Table 1.

Example 3

This Example was performed in the same manner as Example 1, except that in the production of a matte embossing roll, first irregularities were formed by the pressure engraving for forming a diagonal-line shape having a depth of 120 μm by the mill graving with #300 mesh and second irregularities were formed on the surface of a chrome plating layer by the sandblast method with #80 mesh.

Example 4

This Example was performed in the same manner as Example 1, except that in the production of a matte embossing roll, first irregularities were formed by the pressure engraving for forming a diagonal-line shape having a depth of 120 μm by the mill graving with #300 mesh and second irregularities were formed on the surface of a chrome plating layer by the sandblast method with #200 mesh.

Example 5

This Example was performed in the same manner as Example 1, except that the composition of a PVA aqueous solution was changed, as shown in Table 1.

Comparative Example 1

This Example was performed in the same manner as Example 1, except that the composition of a PVA aqueous solution was changed, as shown in Table 1, and that the matte embossment was not performed.

Comparative Example 2

This Example was performed in the same manner as Example 1, except that in the production of a matte embossing roll, first irregularities were formed by the pressure engraving for forming a diagonal-line shape having a depth of 40 μm by the mill graving with #600 mesh and second irregularities were formed on the surface of a chrome plating layer by the sandblast method with #60 mesh.

Comparative Example 3

This Example was performed in the same manner as Example 1, except that in the production of a matte embossing roll, first irregularities were formed by the pressure engraving for forming a diagonal-line shape having a depth of 60 μm by the mill graving with #380 mesh and second irregularities were formed on the surface of a chrome plating layer by the sandblast method with #280 mesh.

Comparative Example 4

This Example was performed in the same manner as Example 1, except that a matte embossing roll was produced by a method described below to use a matte embossing roll having no second irregularities.

[Production of Matte Embossing Roll]

A roll having a roll surface of iron was subjected to the pressure engraving to form a diagonal-line shape having a depth of 190 μm by the mill graving with #200 mesh as shown in Table 1, and thus, first irregularities were formed. Thereafter, a chrome plating layer of about 5 μm was formed thereon to obtain a matte embossing roll.

TABLE 1

|  | Composition (% by mass) | | | | | Details of inorganic particle | | | Matte embossment | | Second irregularities Mesh |
|---|---|---|---|---|---|---|---|---|---|---|---|
|  | PVA (1) | PVA (2) | GL | TMP | Inorganic particle | Type | Average particle size (μm) | Oil absorption (ml/100 g) | First irregularities Mesh | Depth (μm) | |
| Example 1 | 84.5 |  | 13 | 2.5 | 0 | — | — | — | #380 | 60 | #60 |
| Example 2 | 83.5 |  | 13 | 2.5 | 1 | B | 3.9 | 320 | #380 | 60 | #60 |
| Example 3 | 84.5 |  | 13 | 2.5 | 0 | — | — | — | #300 | 120 | #80 |
| Example 4 | 84.5 |  | 13 | 2.5 | 0 | — | — | — | #300 | 120 | #200 |
| Example 5 | 13.7 | 77.3 | 1 | 6 | 2 | B | 3.9 | 320 | #380 | 60 | #60 |
| Comparative Example 1 | 14.0 | 78.9 | 1 | 6.1 | 0 | — | — | — | — | — | — |
| Comparative Example 2 | 84.5 |  | 13 | 2.5 | 0 | — | — | — | #600 | 40 | #60 |
| Comparative Example 3 | 84.5 |  | 13 | 2.5 | 0 | — | — | — | #380 | 60 | #280 |
| Comparative Example 4 | 84.5 |  | 13 | 2.5 | 0 | — | — | — | #200 | 190 | — |

\* In Table 1, "% by mass" is based on the amount of the water-soluble packaging film.

TABLE 2

|  | Film surface roughness | | Change-with-time of surface state | | | | Blocking resistance | | Solubility | | | |
|---|---|---|---|---|---|---|---|---|---|---|---|---|
|  | Ra (μm) | Rz (μm) | Ra after time course (μm) | Rz after time course (μm) | Ra ratio | Rz ratio | Peeling force (N/15 mm) | Evaluation | Foreign matter on appearance | Rapid solubility Break time | Rapid solubility Solution time | Chemical resistance water solubility | Roll durability |
| Example 1 | 0.55 | 5.10 | 0.54 | 5.13 | 0.98 | 1.01 | 0.17 | A | A | 1 | 1 | 2 | A |
| Example 2 | 0.60 | 5.34 | 0.66 | 6.14 | 1.10 | 1.15 | 0.02 | A | A | 1 | 1 | 2 | A |
| Example 3 | 0.35 | 3.29 | 0.30 | 3.08 | 0.86 | 0.94 | 0.23 | A | A | 1 | 1 | 2 | A |
| Example 4 | 0.33 | 3.21 | 0.32 | 3.17 | 0.97 | 0.99 | 0.27 | A | A | 1 | 1 | 2 | A |
| Example 5 | 0.65 | 5.39 | 0.75 | 6.20 | 1.16 | 1.15 | 0.03 | A | A | 1 | 1 | 1 | A |
| Comparative Example 1 | 0.03 | 0.28 | 0.03 | 0.27 | 1.00 | 0.96 | 3.6 | C | A | 1 | 1 | 1 | — |
| Comparative Example 2 | 0.15 | 1.38 | 0.14 | 1.35 | 0.93 | 0.98 | 1.2 | C | A | 1 | 1 | 2 | A |
| Comparative Example 3 | 0.27 | 2.88 | 0.25 | 2.77 | 0.93 | 0.96 | 0.62 | C | A | 1 | 1 | 2 | A |
| Comparative Example 4 | 1.1 | 9.3 | 1.01 | 8.89 | 0.92 | 0.96 | 0.02 | A | A | 1 | 1 | 2 | B |

Example 6

This Example was performed in the same manner as Example 1, except that in preparation of a PVA aqueous solution, a PVA aqueous solution having a concentration of 15% by mass was prepared by dissolving and dispersing, in water, 83.5% by mass of the PVA (1), 13% by mass of glycerin used as a plasticizer, 2.5% by mass of trimethylolpropane, and 1% by mass of the inorganic particle A based on the amount of a resultant water-soluble packaging film, as shown in Table 3.

Example 7

This Example was performed in the same manner as Example 6, except that in the production of a matte embossing roll, second irregularities were formed by the sandblast method with #200 mesh, and that the composition of a PVA aqueous solution was changed, as shown in Table 3.

Examples 8, 11 and 12

These Examples were performed in the same manner as Example 6, except that the composition of a PVA aqueous solution was changed, as shown in Table 1.

Examples 9 and 10

These Examples were performed in the same manner as Example 6, except that in the production of a matte embossing roll, first irregularities were formed by the pressure engraving for obtaining a depth of 120 μm by the mill graving with #300 mesh and second irregularities were formed by the sandblast method with #80 mesh, and that the composition of a PVA aqueous solution was changed, as shown in Table 3.

Example 13

This Example was performed in the same manner as Example 1, except that the composition of a PVA aqueous solution was changed, as shown in Table 3 to use the inorganic particle D.

Comparative Examples 5 and 6

These Examples were performed in the same manner as Example 6, except that the composition of a PVA aqueous solution was changed, as shown in Table 3, and that the matte embossment was not performed.

Comparative Example 7

This Example was performed in the same manner as Example 6, except that the composition of a PVA aqueous solution was changed, as shown in Table 3 to use the inorganic particle E, and that the filter for causing the PVA aqueous solution to pass was changed to a coarse filter having an opening of 50 μm. Incidentally, when the same filter as that used in Example 6 was used in Comparative Example 7, the filter was clogged due to the inorganic particle, and hence the filter was changed to the coarse filter.

TABLE 3

| | Composition (% by mass) | | | | | | Details of inorganic particle | | | Irregularity shape for matte embossment | | |
|---|---|---|---|---|---|---|---|---|---|---|---|---|
| | | | | | | | | Average particle size (μm) | Oil absorption (ml/100 g) | First irregularities | | Second irregularities |
| | PVA (1) | PVA (2) | PVA (3) | GL | TMP | Inorganic particle | Type | | | Mesh | Depth (μm) | Mesh |
| Example 6 | | 83.5 | | 13 | 2.5 | 1 | A | 3 | 300 | #380 | 60 | #60 |
| Example 7 | 12.6 | 71.4 | | 13 | 2.5 | 0.5 | B | 3.9 | 320 | #380 | 60 | #200 |
| Example 8 | 53.6 | 28.9 | | 13 | 2.5 | 2 | C | 8 | 260 | #380 | 60 | #60 |
| Example 9 | | 16.5 | 66 | 13 | 2.5 | 2 | A | 3 | 300 | #300 | 120 | #80 |
| Example 10 | 12.1 | | 68.4 | 13 | 2.5 | 4 | B | 3.9 | 320 | #300 | 120 | #80 |
| Example 11 | | 77.0 | | 22 | | 1 | A | 3 | 300 | #380 | 60 | #60 |
| Example 12 | 82.5 | | | 13 | 2.5 | 2 | B | 3.9 | 320 | #380 | 60 | #60 |
| Example 13 | | 82.5 | | 13 | 2.5 | 2 | D | 6 | 180 | #380 | 60 | #60 |
| Comparative Example 5 | | 82.5 | | 13 | 2.5 | 2 | A | 3 | 300 | — | — | — |
| Comparative Example 6 | | 84.5 | | 13 | 2.5 | | — | — | — | — | — | — |
| Comparative Example 7 | 12.4 | 70.1 | | 13 | 2.5 | 2 | E | 12 | 300 | #380 | 60 | #60 |

* In Table 3, "% by mass" is based on the amount of the water-soluble packaging film.

TABLE 4

| | Film surface roughness | | Change over time of surface state | | | | Blocking resistance | | Solubility | | | |
|---|---|---|---|---|---|---|---|---|---|---|---|---|
| | | | Ra after time | Rz after time | | | Peeling force | | Rapid solubility | Chemical resistance | | |
| | Ra (μm) | Rz (μm) | course (μm) | course (μm) | Ra ratio | Rz ratio | (N/15 mm) | Evaluation | Foreign matter on appearance | Break time | Solution time | water solubility | Roll durability |
| Example 6 | 0.39 | 3.48 | 0.43 | 3.79 | 1.11 | 1.09 | 0.08 | A | A | 1 | 1 | 1 | A |
| Example 7 | 0.43 | 3.66 | 0.48 | 4.06 | 1.11 | 1.11 | 0.09 | A | A | 1 | 1 | 1 | A |
| Example 8 | 0.77 | 6.95 | 0.83 | 7.58 | 1.07 | 1.09 | 0.01 | A | A | 1 | 1 | 1 | A |
| Example 9 | 0.34 | 3.31 | 0.36 | 3.59 | 1.06 | 1.08 | 0.05 | A | A | 1 | 1 | 1 | A |
| Example 10 | 0.87 | 8.21 | 1.12 | 9.85 | 1.29 | 1.20 | 0.01 | A | A | 1 | 1 | 1 | A |
| Example 11 | 0.35 | 3.33 | 0.36 | 3.45 | 1.03 | 1.04 | 0.16 | A | A | 1 | 1 | 1 | A |
| Example 12 | 0.60 | 5.34 | 0.66 | 6.14 | 1.10 | 1.15 | 0.02 | A | A | 1 | 1 | 2 | A |
| Example 13 | 0.75 | 6.30 | 0.70 | 6.05 | 0.93 | 0.96 | 0.36 | B | A | 1 | 1 | 1 | A |
| Comparative Example 5 | 0.12 | 1.38 | 0.16 | 1.88 | 1.30 | 1.36 | 0.51 | C | A | 1 | 1 | 1 | — |
| Comparative Example 6 | 0.03 | 0.28 | 0.03 | 0.27 | 1.00 | 0.96 | 3.6 | C | A | 1 | 1 | 1 | — |
| Comparative Example 7 | 1.80 | 9.80 | 1.93 | 10.90 | 1.07 | 1.11 | 0.04 | A | B | 1 | 1 | 1 | B |

In each of the Examples, when the PVA film was subjected to the embossment by using the embossing roll having the first irregularities engraved with 300 to 400 mesh and the second irregularities formed by the sandblast with 250 mesh or less, irregularities having a surface roughness (Ra) of 0.3 to 1 μm and a maximum height (Rz) of 3 to 9 μm were formed on the film surface. Thus, all of the blocking resistance, the rapid solubility and the roll durability could be good. Besides, in each of the Examples, the Ra ratio and the Rz ratio were close to 1, and the shape of the irregularities on the film surface could be kept even when the film was caused to stand under a high temperature environment for a long period of time.

On the contrary, in each of the Comparative Examples, the embossment was not performed, or even when the embossment was performed, the prescribed first and second irregularities were not formed on the embossing roll used in the embossment. Therefore, irregularities having a surface roughness (Ra) of 0.3 to 1 μm and a maximum height (Rz) of 3 to 9 μm were not formed on the film surface, and one of the blocking resistance in a long-term high-temperature storage and the roll durability was not good.

Besides, the water-soluble packaging film according to each of Examples 2 and 5 to 12 comprised the inorganic particle having an average particle size of 1 to 10 μm and an oil absorption of 230 to 400 ml/100 g. Therefore, all of the blocking resistance in a long-term high-temperature storage, the rapid solubility and the roll durability could be excellent.

On the other hand, although each of Example 13 and Comparative Example 7 comprised the inorganic particle, the oil absorption was less than 230 ml/100 g, or the average particle size of the inorganic particle was larger than 10 μm, and hence, one of the blocking resistance in a long-term high-temperature storage and the roll durability was not excellent. Besides, in Comparative Example 7, the average particle size of the inorganic particle was so large that the filter used in forming the film needed to be coarse, and hence, a foreign matter was mixed into the water-soluble packaging film.

Incidentally, since the sulfonate group-modified or pyrrolidone ring group-modified polyvinyl alcohol was used as the PVA resin in each of Examples 5 to 11 and 13, the chemical resistance was good, and the water solubility after a chemical resistance test was excellent.

The invention claimed is:
1. A water-soluble packaging film comprising a polyvinyl alcohol resin in an amount of 70% by mass or more relative to the total weight of the water-soluble packaging film,
the water-soluble packaging film having, on a major surface thereof, irregularities having a surface roughness (Ra) of 0.3 to 1 μm and a maximum height (Rz) of 3 to 9 μm, wherein the surface roughness (Ra) and the maximum height (Rz) are measured in accordance with JIS B0601-2001.

2. The water-soluble packaging film according to claim 1, wherein the water-soluble packaging film comprises an inorganic particle, and
the inorganic particle has an average particle size of 1 to 10 μm and an oil absorption of 230 to 400 ml/100 g.

3. The water-soluble packaging film according to claim 2, wherein a content of the inorganic particle is 0.3 to 6% by mass.

4. The water-soluble packaging film according to claim 2, wherein the polyvinyl alcohol resin comprises at least one polyvinyl alcohol resin selected from the group consisting of a pyrrolidone ring group-modified polyvinyl alcohol and a sulfonate group-modified polyvinyl alcohol.

5. The water-soluble packaging film according to claim 4, wherein a pyrrolidone ring group modification degree of the pyrrolidone ring group-modified polyvinyl alcohol is 0.1 to 20% by mol.

6. The water-soluble packaging film according to claim 4, wherein a sulfonate group modification degree of the sulfonate group-modified polyvinyl alcohol is 0.1 to 6% by mol.

7. The water-soluble packaging film according to claim 4, wherein each of the pyrrolidone ring group-modified polyvinyl alcohol and the sulfonate group-modified polyvinyl alcohol has a saponification degree of 80 to 99.9% by mol.

8. The water-soluble packaging film according to claim 1, wherein the polyvinyl alcohol resin has a saponification degree of 80 to 99.9% by mol.

9. The water-soluble packaging film according to claim 1, wherein the polyvinyl alcohol resin comprises an unmodified polyvinyl alcohol.

10. The water-soluble packaging film according to claim 1, further comprising a plasticizer.

11. The water-soluble packaging film according to claim 10, wherein a content of the plasticizer is 3 to 25% by mass.

12. The water-soluble packaging film according to claim 1, wherein the water-soluble packaging film comprises an inorganic particle, and the inorganic particle has an average particle size of 2 to 10 µm.

13. The water-soluble packaging film according to claim 2, wherein the inorganic particle has an average particle size of 2 to 10 µm.

* * * * *